United States Patent [19]

Suzuki

[11] Patent Number: 5,433,181
[45] Date of Patent: Jul. 18, 1995

[54] ACTUATING SYSTEM FOR ACCELERATOR

[75] Inventor: Kazuhiro Suzuki, Takarazuka, Japan

[73] Assignee: Nippon Cable System Inc., Hyogo, Japan

[21] Appl. No.: 257,520

[22] Filed: Jun. 9, 1994

[30] Foreign Application Priority Data

Jun. 16, 1993 [JP] Japan .................................. 5-144692

[51] Int. Cl.⁶ ............................................. F02D 11/10
[52] U.S. Cl. ..................................... 123/399; 123/400
[58] Field of Search ................ 123/399, 400, 342, 361

[56] References Cited

U.S. PATENT DOCUMENTS

| | | | |
|---|---|---|---|
| 4,655,180 | 4/1987 | Bauer et al. | 123/399 |
| 4,756,287 | 7/1988 | Sakakihara et al. | 123/361 |
| 4,900,998 | 2/1990 | Shyi | 123/399 |
| 4,938,327 | 7/1990 | Tominaga | 123/361 |
| 4,950,965 | 8/1990 | Kenny et al. | 123/400 |
| 4,958,607 | 9/1990 | Lundberg | 123/399 |
| 4,972,817 | 11/1990 | Wilde et al. | 123/399 |
| 5,113,825 | 5/1992 | Takahashi | 123/400 |
| 5,345,157 | 9/1994 | Suzuki et al. | 123/400 |

*Primary Examiner*—Thomas N. Moulis
*Attorney, Agent, or Firm*—Antonelli, Terry, Stout & Kraus

[57] ABSTRACT

An actuating system for accelerator comprising: a main body comprising a motor for driving said accuating system, a reduction gear including a means for locking connected to an output shaft of said motor, and a pulley for winding or supplying a cable, said pulley having an internal gear engaged with a gear provided on said output shaft; a control cable comprising a tubular conduit and an inner cable which is slidably inserted into said conduit, wherein an end portion for driving said pulley of said inner cable is wound by said pulley; a bracket for fixing said main body to a car body, wherein said pulley is rotatably carried by said bracket, wherein said bracket is connected to an end part of said conduit; a casing in which said body and a means for controlling said main body are enclosed together with said bracket in a manner that an elastic body is interposed between said main body and said bracket, wherein an opening for directing said cable is formed on said casing, wherein said opening retains a part of said control cable in a manner that an elastic body is interposed between a periphery of said opening and said control cable; and a means for connecting said control cable to a controlled device wherein said means is formed on a driven-side end of said control cable.

2 Claims, 5 Drawing Sheets

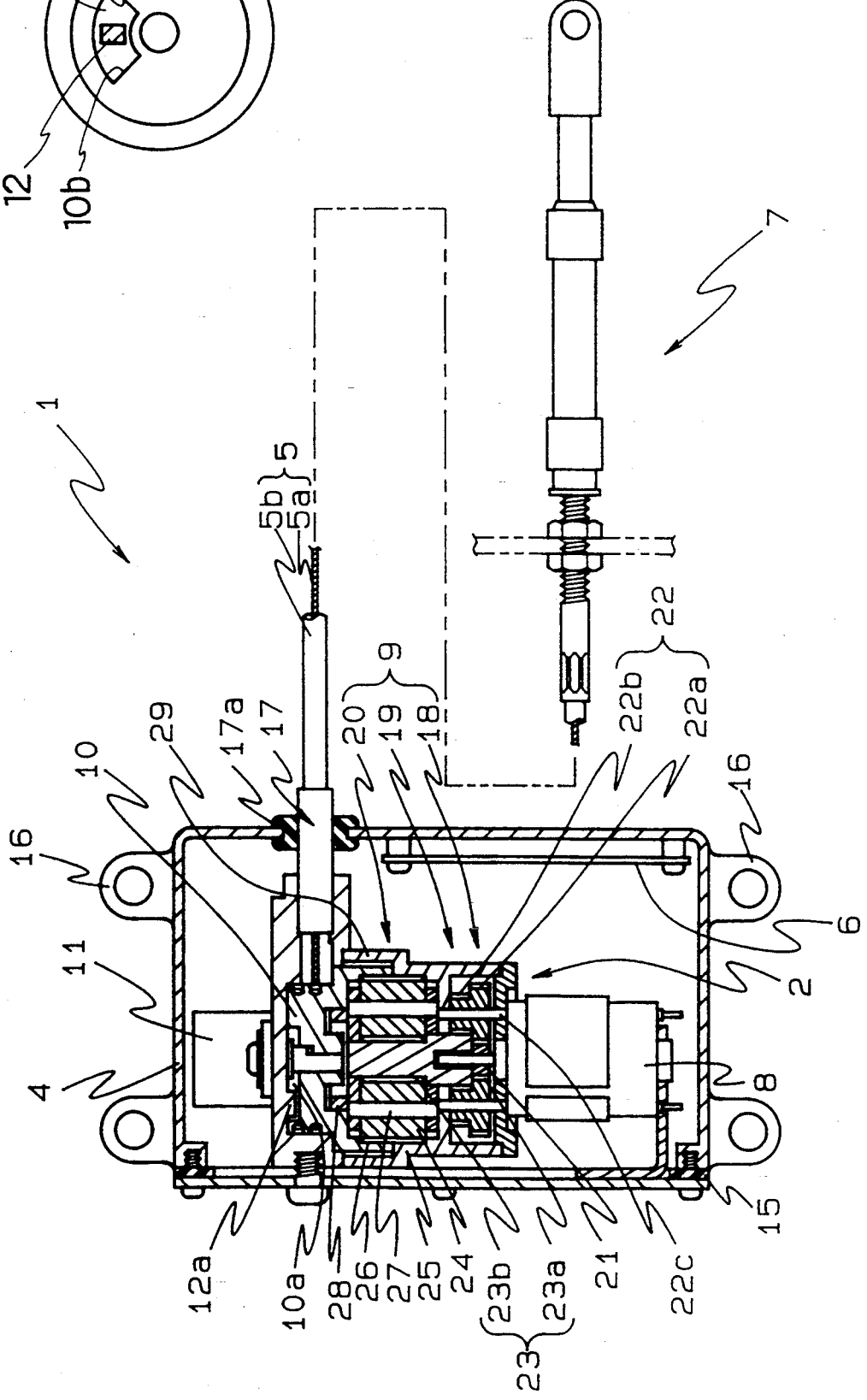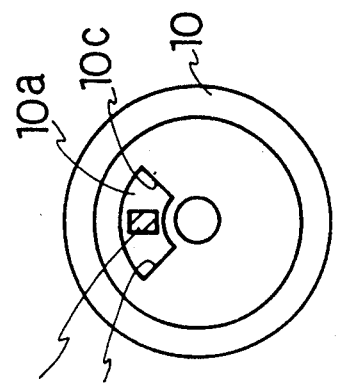

ACTUATING SYSTEM FOR ACCELERATOR

BACKGROUND OF THE INVENTION

The present invention relates to actuating system for accelerator. More particularly it relates to the actuating system for accelerator for remotely operating an accelerator of an engine employed in automobiles or construction machines.

Conventionally, an actuator for controlling an accelerator has been employed to remotely control the accelerator for an engine ( especially for a Diesel engine) or automatically drive at constant velocity in automobiles or construction machines.

As shown in FIG. 5, the above-mentioned conventional actuator detects rotation angle of a pulley 51 for the engine which is provided in a governor for maintaining a constant speed of the engine by virtue of a detecting apparatus of the rotational angle such as a potentiometer P. Then, the actuator compares a signal corresponding to the rotational angle with an indicating signal transmitted from an operating apparatus (or an apparatus for setting a revolution) in a controller C. Thereafter, the actuator transmits feedback signals to a motor M of the actuator in order to neglect a deviation between the signal corresponding to the rotational angle and the indicating signal.

The actuator 52 is composed of a reduction gear 53, a pulley 54 for winding a control cable connected to an output shaft of the reduction gear 3 and a housing for accomodating the reduction gear 53 and the pulley 54. The actuator 52 is separately provided with the controller C. In other words, the actuator 52 is not integrated with the controller C. The housing 55 is composed of a frame part 55a, a lid part 55b and a base plate 55. A hole for passing the control cable ( hereinafter referred to as cable), which is wound by the pulley 54 and supplied, is formed on the housing 55. Further, conduit 57 for the cable is fixed to the housing 55.

With respect to the above-mentioned conventional actuator, the controller is separated from the actuator, i.e. the actuator is not integrated with the controller. For that reason, it is necessary to protect the controller, and it is troublesome to provide a car body with the actuator. Further, the conduit 57 of the cable is fixed to the housing 55. For that reason, when the actuator is operated, the reaction force (pressurizing force and tractive force transmitted from the conduit 57) due to the operation of the actuator is directly acted (or forced) on the housing 55. For that reason, the housing 55 is required to be firmly connected with the conduit 57, the motor M and the like, so that the housing 55 should be heavy-walled. The housing 55 should be made of a material having a high strength. The above-mentioned conventional actuator includes a portion where the motor M is connected with a base plate 55c of the housing, the other portion where a cylindrical part 55a is connected with the base plate 55c, still other portion where the lid part 55b is connected with each of the conduits, and the like, each of the portions is subjected to external force. For that reason, the above-mentioned conventional actuator has a tendency in which there arises a problem in waterproofing thereof.

The objects of the present invention is to delete the problem mentioned above, and to provide an actuating system for accelerator in which a body of an accuator is not necessarily constructed firmly. The other object of the present invention is to provide an accuating system for accelerator having a simple construction in which waterproofing is superior. Still other object of the present invention is to provide an actuating system for accelerator which is integratedly combined with a controller so that the accuating system is easily mounted on the car body.

SUMMARY OF THE INVENTION

An actuating system for accelerator (hereinafter referred to as an accuating system simply) of the present invention comprising:

(a) a main body comprising a motor for driving said accuating system, a reduction gear including a means for locking connected to an output shaft of said motor, and a pulley for winding or supplying a cable, said pulley having an internal gear engaged with a gear provided on said output shaft;

(b) a control cable comprising a tubular conduit and an inner cable which is slidably inserted into said conduit, wherein an end portion for driving said pulley of said inner cable is wound by said pulley;

(c) a bracket for fixing said main body to a car body, wherein said pulley is rotatably carried by said bracket, wherein said bracket is connected to an end part of said conduit;

(d) a casing in which said body and a means for controlling said main body are enclosed together with said bracket in a manner that an elastic body is interposed between said main body and said bracket, wherein an opening for directing said cable is formed on said casing, wherein said opening retains a part of said control cable in a manner that an elastic body is interposed between a periphery of said opening and said control cable; and (e) a means for connecting said control cable to a controlled device wherein said means is formed on a driven-side end of said control cable.

The means for connecting preferably comprising:

(a) a guide pipe oscillatably connected to an end of said conduit in a manner that an elastic joint member is interposed between said guide pipe and said end of said conduit;

(b) a cylinder for connecting said means for connecting to said controlled device, wherein said cylinder is slidably inserted into said guide pipe, wherein a portion for connecting to said controlled device is formed on a tip of said cylinder; and (c) a spring for biassing said inner cable inserted into said cylinder to said tip of said cylinder in the direction of the driven-side end of said spring, wherein said tip has an opening which the driven-side end of said control cable projects therethrough.

BRIEF DESCRIPTION OF THE DRAWINGS

FIG. 1(a) is an explanatory view showing an embodiment of actuating system of the present invention;

FIG. 1(b) is a front view showing pulley of FIG. 1;

DETAILED DESCRIPTION

Figure 2:
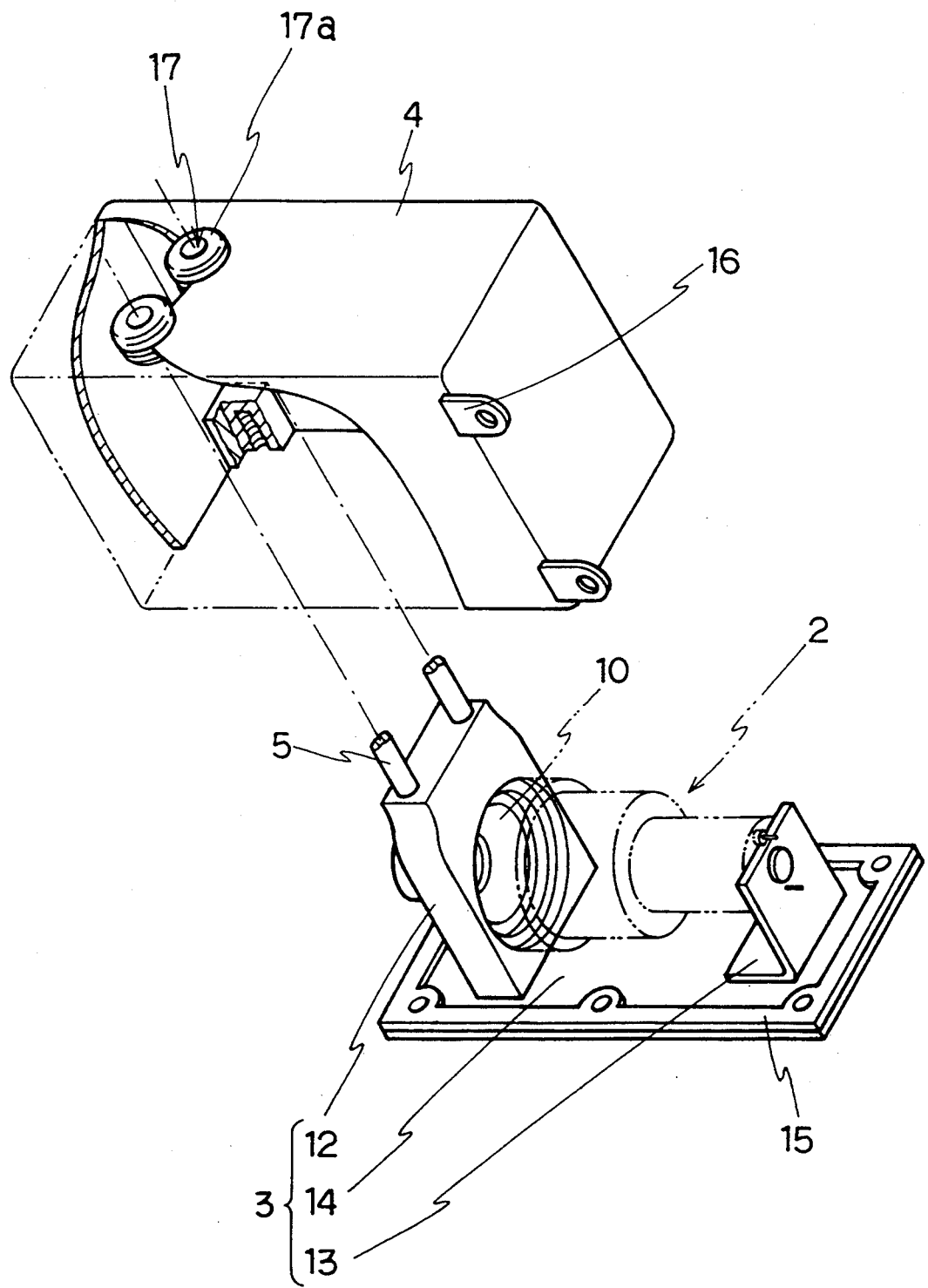
FIG. 2 is a cross sectional view showing a bracket and a casing of the actuating system of FIG. 1.

The actuating system of the present invention will be explained with reference to attached drawings.

In FIG. 1(a), numeral 1 denotes an actuating system. The actuating system 1 comprises a main body 2, a bracket 3, a casing 4, cable 5, an electric circuit 6 for driving the main body 2, and a means for connecting 7.

The main body 2 comprises a motor 8, a pulley 10 for widing the cable 5, and a potentiometer 11.

As shown in FIG. 2, the bracket 3 comprises a first support member 12 for retaining the pulley 10 while allowing to rotate, a second support member 13 for retaining a rear side of the motor 8, and a rectangular base member 14 in which the first support member 12 and the second support member 13 are fixed.

A fan-like-shaped groove 12a is formed on the upper side of the pulley 10 as shown in FIG. 1(a). The groove 10a serves together with a stopper 12a formed on the first support member 12 as a means for restricting a rotational movement of the pulley 10. The stopper 12a is positioned in a manner as to oppose to the upper side of the pulley 10. Further, the stopper 12a is engaged with the groove 10a with having a play. For that reason, the pulley 10 can rotate in the both clockwise and counterclockwise direction as long as the stopper 12 is contacted with marginal edges 10b, 10c of the groove 10a. Each of the marginal edges 10b and 10c serves as an end (or terminal) of the rotational movement of the pulley 10.

The casing 4 has a box like shape composed of six faces, in which one of six faces is removed. Thickness of the casing 4 is relatively thin. After the main body 2 fixed to the bracket 3 is enclosed by the casing 4, the main body 2 is connected to the base member 14 by screw threads in a manner that a gasket 15 made of an elastic body is interposed between the main body 2 and the base member 14. The casing 4 has leg members 16 for mounting the casing 4 on the base member 14.

A pair of openings 17 are formed on a face of the casing 4. The face is opposed to the base member 14. Each of a pair of cables 5 which is supplied from the main body 2 is inserted into the opening 17.

A pair of bushes 17a are provided on each periphery of the openings 17. The bush 17a is composed of an elastic body. By virtue of the bush 17a, waterproofing effect is realized. The slight movement in the radial direction of each cable 5 is allowed since the bushing is composed of an elastic body. For that reason, the main body 2 is mounted on the bracket 3, and the casing 4 is connected to the bracket 3 without high precision in size and construction. The casing 4 is connected to the main body 2 in such a manner that the gasket 15 and the bush 17a are interposed between the main body 2 and the casing 4. In other words, the main body 2 is connected to the casing in a floating manner, i.e. the main body 2 is connected to the car body in a floating manner. For that reason, vibration transmitted from the main body 2 to the car body is reduced. An electric circuit board 6 for controlling the main body 2 is arranged within the casing 4.

The reduction gear 9 included in the main body 2 comprises a first stage reduction part 18, a second stage reduction part 19, and a third stage reduction part 20.

The first stage reduction part 18 comprises a pinion 21 coaxially connected with an output shaft of the motor 8, and three gears 22, each of which is arranged around the pinion 21 in a circumscribed manner. The pinion 21 serves as a sun gear.

An upper gear 22b and a lower gear 22a are toothed on an outer surface of each of the gears 22, on upper side and lower side of each gear 22 in a coaxial manner. The pinion 21 is engaged with each of the lower gears 22a. Each of the gears 22 does not revolve around the pinion 21 since a shaft of each gear 22 is fixed.

The second stage reduction part 19 comprises an upper gear 22 and a lower side gear 23a of a bar-like-shaped gear 23.

The bar-like-shaped gear 23 is arranged on the pinion 21 in a slidable manner. The bar-like-shaped gear 23 is coaxial with the pinion 21. Further, an upper side gear 23b and a lower side gear 23a are toothed on an outer surface of the bar-like-shaped gear 23. The upper gear 22b of the gear 22 is engaged with the lower side gear 23a.

The third stage reduction part 20 comprises the upper side gear 23b, two planetary gears 24, each of which is engaged with the upper side gear 23b, a fixed internal gear 25, and a movable internal gear 26. Both of the fixed internal gear 25 and the movable internal gear 26 are engaged with the planetary gears 23 in parallel. Numeral 27 denotes a carrier for allowing the planetary gears 24 to revolve in a manner as to be integrated with each other. Each of the support member 28 is combined with each other.

The fixed internal gear 25 is toothed on an inner surface of a cylindrical housing 29. The movable internal gear 26 is toothed on an inner surface of the pulley 10. Number of tooth of the fixed internal gear 25 is slightly different from that of the movable internal gear 26 (i.e. serving as a differential planetary gear).

An end of the inner cable 5a of each of cables 5 is connected to the pulley 10 and the cables 5 is wound by the pulley 10.

On the other hand, each of a pair of cables 5 is provided with a means 7 for connecting the other eand of each cable 5 to the controlled device (not shown in Figures) on the driven-side end portion of each cable 5.

Figure 3:
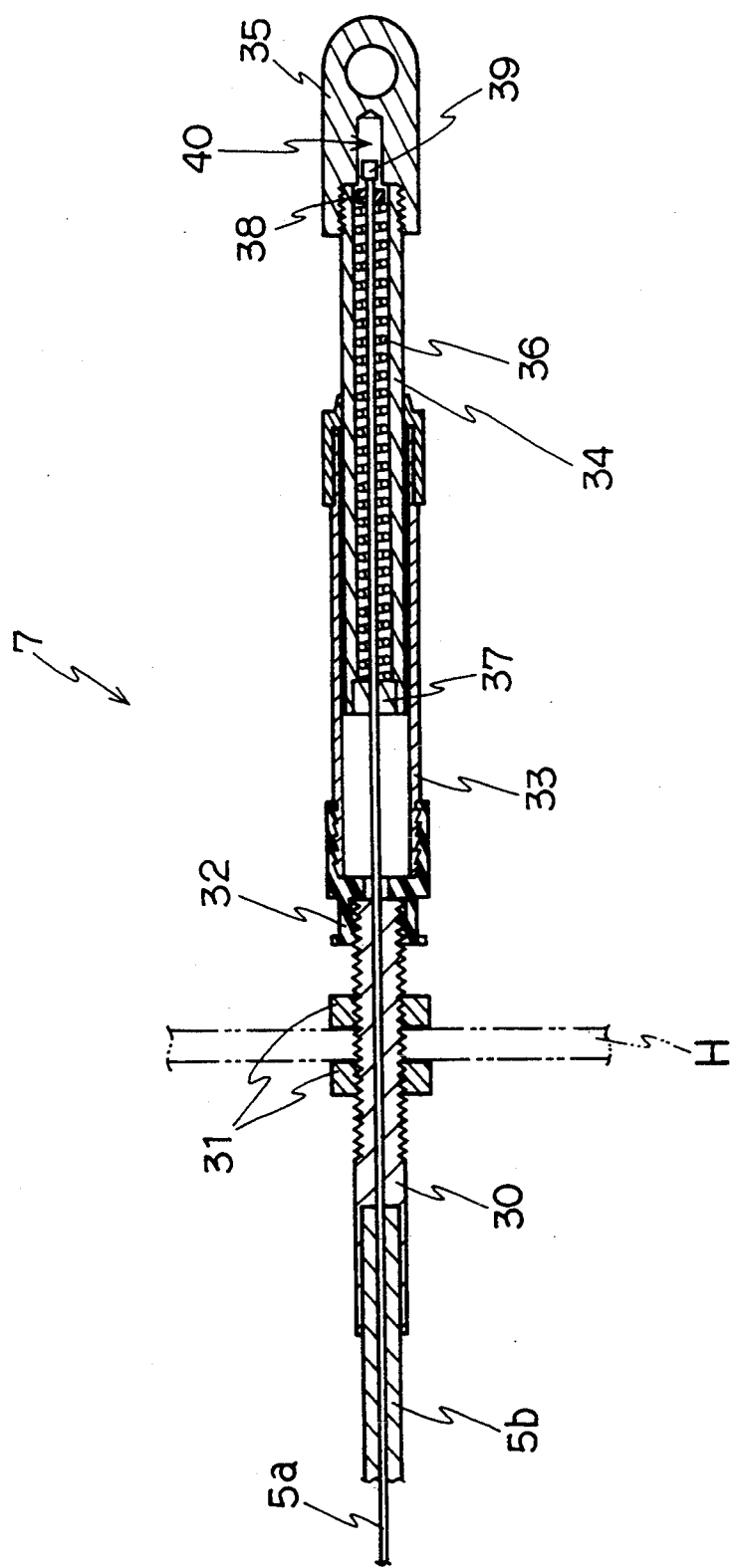
FIG. 3 is a cross sectional view showing a means for connecting of the actuating system of FIG. 1.

As shown in FIG. 3, in the means 7, a tubular cap 30 is fixed to the conduit 5b at the driven-side end (hereinafter referred to as an end simply) of the conduit 5b.

The cap 30 is threaded on an outer surface of the cap 30. The inner cable 5a is inserted into the cap 30. The cap 30 is fixed to a bracket of the device to be equipped or a housing H by a pair of nuts 31, each of which is engaged with the cap 30 in such a manner that the housing H is interposed between the pair of nuts 31. A tip of the cap 30 is oscillatably connected to a guide pipe 33 in a manner that a connecting piece 32 composed of an elastic material such as a rubber is interposed between the cap 30 and the guide pipe 33. The guide has a hollow portion longitudinally formed therein. A tubular spring cover 34 is slidably accommodated in the hollow space. The spring cover 34 projected from the guide pipe is provided with an eye end 35 for connecting to the device at the tip of the spring cover 34 in such a manner as to cover the tip of the spring cover 34. On the other hand, a loose spring 36 is accommodated in a hollow space in the spring cover 34 in such a manner that the loose spring 36 is sprirally wound around the inner cable 5a inserted into the spring cover 34.

The spring cover 34 is provided with a spring shoe 37 at the base part of the spring cover. The spring shoe 37 has a hole for inserting the inner cable 5a. The tip of the loose spring 36 is contacted with a bush 38 serving as a stopper. The bush 38 has an opening through which the inner cable 5a is inserted. The bush 38 is slidably inserted into the hollow space in the spring cover 34. A nipple 39 is connected to the inner cable 5a at the end of the inner cable 5a, so that the bush 38 is not removed from the inner cable 5a due to a reaction force of the loose spring 36.

For that reason, the inner cable 5a is biassed in the direction of the tip of the loose spring 36.

In the eye end 35, a recess 40 for slightly inserting the tip (i.e. the nipple 39) of the inner cable 5a. In other words, the recess 40 serves as a space for a play.

By virtue of thus constructed means 7, even if any one of the pair of cables reaches the end of the rotational stroke of the pulley, the inner cable 5a of the other cable does not loose.

Figure 4:
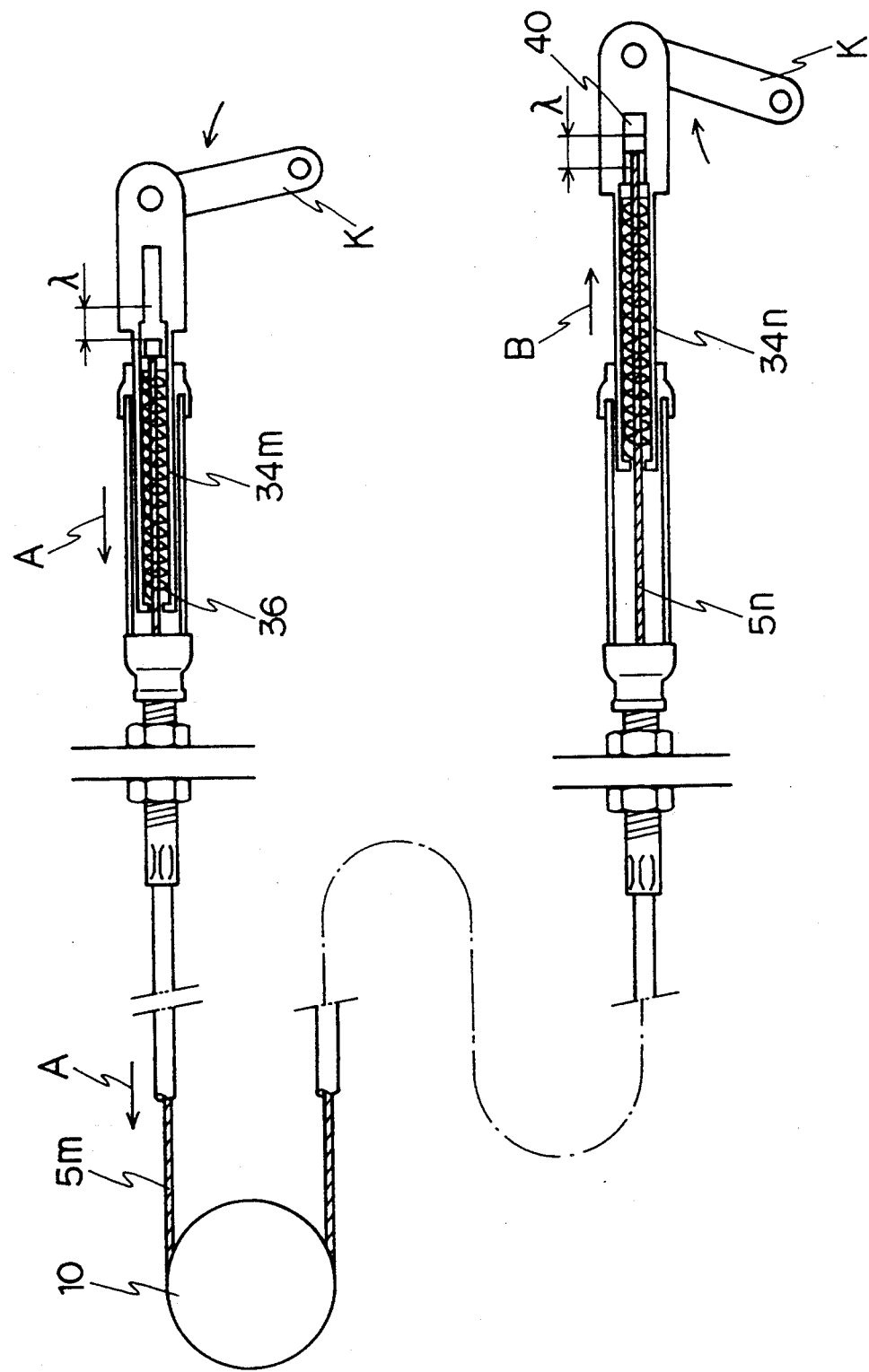
FIG. 4 is an explanatory view showing an operation of the means for connecting of FIG. 3.
Figure 5:
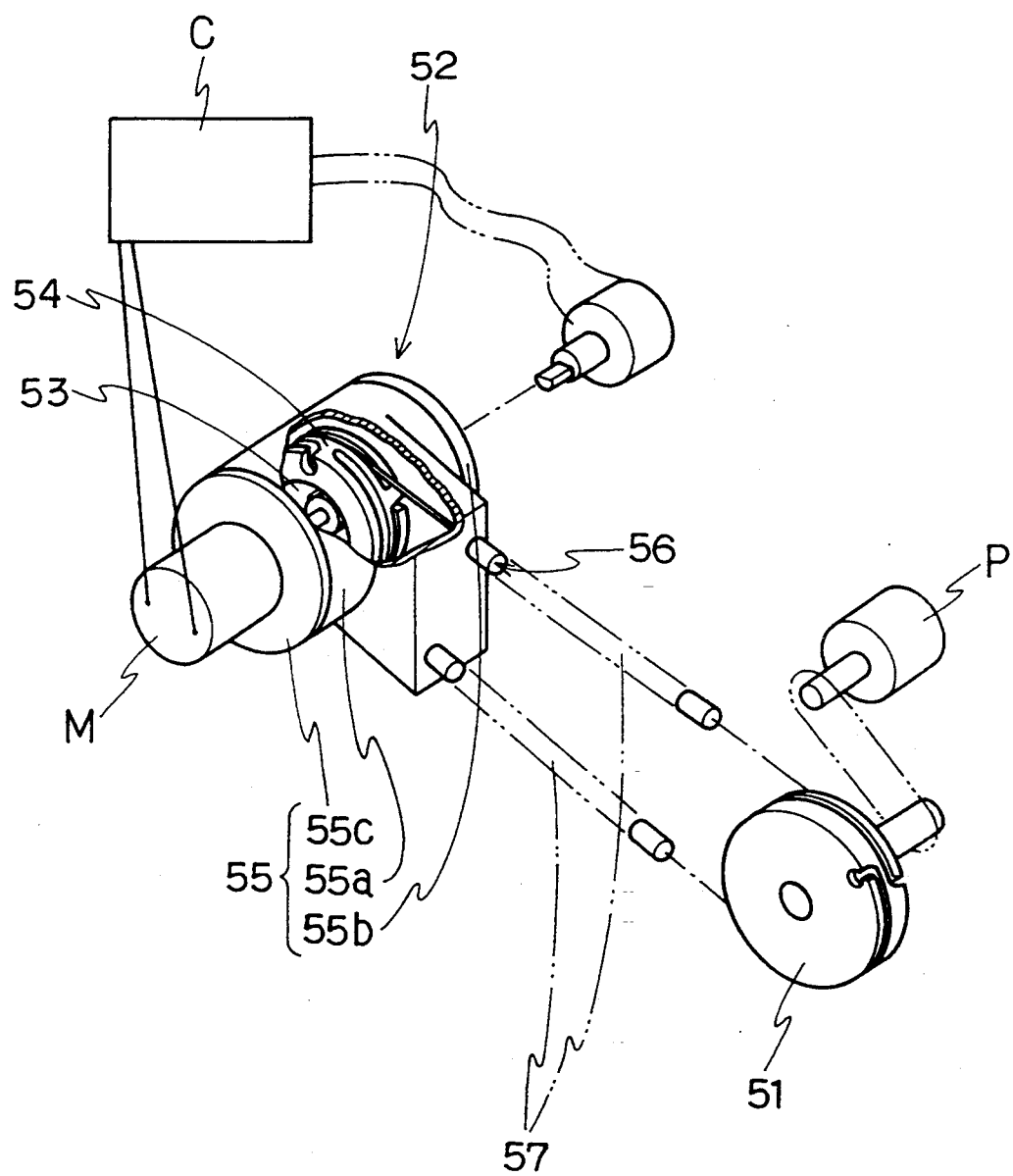
FIG. 5 is an explanatory view of an example of a conventional actuating system.

That is, as shown in FIG. 4, when the inner cable 5m of a cable (upper side of FIG. 4) is pulled, and the spring cover 34m is moved in the direction of arrow A, then the spring cover reaches the stroke end of a telescopical movement of the spring cover relative to the guide pipe, the pulley 10 can still rotate. For that reason, the inner cable 5m is slightly pulled in the direction of arrow A with a distance of λ while pressing the loose spring. At this movement, the inner cable 5n of the other cable (lower side of FIG. 4) is supplied, the spring cover 34 is moved in the direction of arrow B, then the spring cover 34n reaches the stroke end of the telescopical movement of the spring cover 34n relative to the guide pipe, thereafter the inner cable 5n is slightly pushed in the direction of arrow B with a distance of λ. However, since there is formed the recess 40, there appears no loosing in the inner cable 5n.

While on the other hand, with respect to the conventional actuator, for example, the controlled device is connected to the conduit in such a manner that the loose spring is interposed between the conduit and the controlled device, thereby the inner cable is prevented from loosing. If the cables are arranged in a manner as to extend linearly, the inner cable of each cable is not prevented from loosing. For that reason, degree of freedom for arranging the cables is restricted.

With respect to the present invention, a sliding movement of the spring cover relative to the guide pipe, and an oscillating movement of the guide pipe 33 relative to the tubular cap 30 are realized by a swivel mechanism employing a simple connecting piece 32 composed of an elastic body which is small in size and light in weight.

By virtue of the light weight, there is few possibility to change in rotation of the engine.

Thus constructed actuating system of the present invention is assembled by a procedures mentioned as follows:

The cable 5 which extends from the main body 2 is inserted into the opening 17 formed on the casing 4. Please note that the electric circuit board 6 is accommodated within the casing 4 beforehand. The first support member 12 is mounted on the pulley 10 of the main body 2 in a manner that the stopper 12a of the first support member 12 contacts with the end portion of the groove 10a formed on the pulley.

At this state, "high-idle" condition is determined, then indicated voltage of the potentiometer 11 and the length for playing of the inner cable 5a are adjusted. The rear side of the motor 8 of the main body 2 is fixed to the second support member 13, and the first support member 12 by a screw thread. Please note, the second support member 13 is secured to the base member 13 by welding or brazing beforehand.

Finally, the casing 4 is connected to the base member 14 in a manner that the gasket is interposed between the casing 4 and the base member 14.

Thus assembled actuating system of the present invention is subjected to all the reaction force from the conduit in operation by the bracket.

For that reason, the bracket and the casing can be formed into any shape without high presicion of work.

Further, in main body can be in the floating state against the car body since the actuating system of the present invention employs an elastic body for sealing. For that reason, vibration transmitted from the main body is remarkably reduced.

Furthermore, when the actuating system includes a means for connecting composed of an elastic joint, of which weight is light, and of which diameter is small, number of rotation of the engine maintains substantially constant value, and degree of freedom for arranging the cable and for connecting the end portion of the cable to the device is increased.

While only certain presently preferred emdobiments have been described in detail, as will be apparent with those familiar with the art, certain changes and modifications can be made without departing from the spirit and scope of the invention as defined in the following claims.

What is claimed is:

1. An actuating system for accelerator comprising:
   (a) a main body comprising a motor for driving said accuating system, a reduction gear including a means for locking connected to an output shaft of said motor, and a pulley for winding or supplying a cable, said pulley having an internal gear engaged with a gear provided on said output shaft;
   (b) a control cable comprising a tubular conduit and an inner cable which is slidably inserted into said conduit, wherein an end portion for driving said pulley of said inner cable is wound by said pulley;
   (c) a bracket for fixing said main body to a car body, wherein said pulley is rotatably carried by said bracket, wherein said bracket is connected to an end part of said conduit;
   (d) a casing in which said body and a means for controlling said main body are enclosed together with said bracket in a manner that an elastic body is interposed between said main body and said bracket, wherein an opening for directing said cable is formed on said casing, wherein said opening retains a part of said control cable in a manner that an elastic body is interposed between a periphery of said opening and said control cable; and
   (e) a means for connecting said control cable to a controlled device wherein said means for connecting is formed on a driven-side end of said control cable.

2. The means for connecting of claim 1, comprising:
   (a) a guide pipe oscillatably connected to an end of said conduit in a manner that an elastic joint member is interposed between said guide pipe and said end of said conduit;
   (b) a cylinder for connecting said means for connecting to said controlled device, wherein said cylinder is slidably inserted into said guide pipe, wherein a portion for connecting to said controlled device is formed on a tip of said cylinder; and
   (c) a spring for biassing said inner cable inserted into said cylinder to said tip of said cylinder in the direction of the driven-side end of said spring, wherein said tip has an opening which the driven-side end of said control cable projects therethrough.

* * * * *